Patented May 9, 1933

1,907,728

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

DISINFECTANT

No Drawing.   Application filed May 12, 1930.   Serial No. 451,847.

The present invention relates to new and useful improvements in germicides and disinfectants. I have found that halogenated phenylphenols or salts thereof, such as monochloro-ortho-phenylphenol or a copper, ammonium, sodium or other metal salt of the latter, can serve as the effective principle in improved disinfectant or antiseptic compositions.

My invention, then, consists of the new compositions herein fully described and particularly pointed out in the claims, the following description setting forth in detail several approved combinations of ingredients embodying my invention, the same constituting, however, but several of various ways in which the principle of my invention may be used.

The abovementioned halogenated phenylphenols may be prepared by halogenation of ortho-phenylphenol. For instance, ortho-phenylphenol may be chlorinated at a temperature between about 60 and 150° C. by gaseous chlorine, with or without a solvent and with or without a chlorine carrier such as iron or iodine. The chlorination is preferably to be discontinued somewhat before sufficient chlorine has been reacted to correspond to the mono-chloro derivative of the phenylphenol, whereby the formation of higher chlorinated derivatives is largely avoided. The crude reaction mixture may be fractionally distilled to separate the monochloro product therefrom, as well as small amounts of polychloro derivatives, if formed, such as the dichloro compound.

I have found that the crude reaction mixture comprising, for instance, unreacted phenylphenol, mono-, di-, and higher chlorinated phenylphenols, may be utilized for germicidal purposes, or that either the refined single halogenated compounds or mixtures thereof may be used. The aforesaid compounds or mixtures thereof may be employed in emulsified form, dissolved or suspended in a suitable liquid vehicle, or in solid form, in which latter case the active ingredient may be admixed with an inert solid material such as silica, graphite, talc, or the like. The abovementioned compounds may also be employed in the form of their salts, such as an alkali-metal salt thereof.

My improved disinfectants, in addition to having strong germicidal properties, are relatively non-poisonous and non-irritating to the higher organisms.

The following table shows the results obtained when testing sodium monochloro-ortho-phenylphenate in aqueous solution, and also monochloro-ortho-phenylphenol in a solution consisting of 1 gm. of said phenol in 2 cc. benzene plus 97 cc. water, according to well-known procedure, against B. typhosus.

| Sample | Dilution | Time of exposure of culture to disinfectant, in minutes | | | Phenol coefficient |
|---|---|---|---|---|---|
| | | 5 | 10 | 15 | |
| Sodium salt | 1:8000 | − | − | − | |
| Sodium salt | 1:8500 | + | + | − | 84.2 |
| Sodium salt | 1:9000 | + | + | + | |
| Chlorophenylphenol | 1:7500 | − | − | − | |
| Chlorophenylphenol | 1:8000 | + | − | + | 79.0 |
| Chlorophenylphenol | 1:8500 | + | + | + | |

(Phenol, used as a standard disinfectant, was effective at a dilution of 1:95).

Accordingly, monochloro-ortho-phenylphenate and the sodium salt thereof, as tested above, are approximately 80 times as effective against B. typhosus as is phenol.

Briefly stated, my invention consists in new and improved disinfectants comprising halogenated ortho-phenylphenol or compounds thereof, particularly chloro-ortho-phenylphenol or the sodium salt of the latter. The new compounds constituting the effective agents in the aforesaid improved compositions are characterized by the general formula;

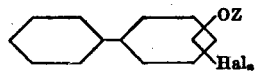

wherein Z represents hydrogen or a positive salt radicle, e. g. ammonium or a metal, and $n$ represents the number of halogen substituents. It is to be noted that the halogen is substituted in the same ring as the OH group.

Other modes of applying the principle of my invention may be employed instead of those explained, change being made as regards the steps or materials employed, provided the details stated by any of the following claims or the equivalent of such be employed.

I therefore particularly point out and distinctly claim as my invention:—

1. A germicidal and antiseptic composition comprising a chloro-ortho phenylphenol derivative characterized by the formula;

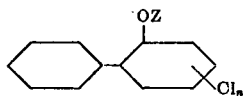

wherein Z represents hydrogen or a positive salt radicle, and $n$ represents the number of chlorine substituents.

2. A germicidal and antiseptic composition comprising a mono-chloro-ortho phenylphenol derivative characterized by the formula;

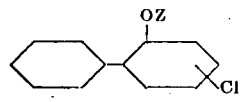

wherein Z represents hydrogen or a positive salt radicle.

3. A germicidal and antiseptic composition comprising a mono-chloro-ortho-phenylphenol.

4. A germicidal and antiseptic composition comprising sodium mono-chloro-ortho phenylphenate.

5. A germicidal and antiseptic composition comprising an aqueous solution of a phenylphenol derivative having the formula

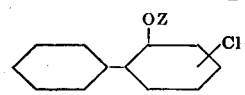

wherein Z represents hydrogen or an alkali metal.

6. A germicidal and antiseptic composition comprising an aqueous solution of mono-chloro-ortho phenylphenol.

7. A germicidal and antiseptic composition comprising an aqueous solution of sodium mono-chloro-ortho phenylphenate.

Signed by me, this 8 day of May, 1930.

EDGAR C. BRITTON.

DISCLAIMER 1,907,728.—*Edgar C. Britton*, Midland, Mich. DISINFECTANT. Patent dated May 9, 1933. Disclaimer filed April 19, 1935, by the assignee, *The Dow Chemical Company*.

Therefore, enters this disclaimer to certain of the claims of the above identified patent, and Hereby disclaims claims 3 and 6.

Hereby disclaims from the scope of claim 1 any composition containing a compound characterized by the formula:

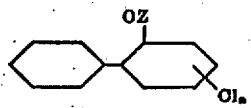

wherein Z represents hydrogen and $n$ represents the integer 1.

Hereby disclaims from the scope of claims 2 and 5 any composition containing a compound characterized by the formula:

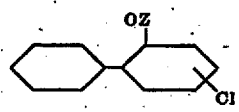

wherein Z represents hydrogen.

[*Official Gazette May 14, 1935.*]